United States Patent
Xu et al.

(10) Patent No.: US 8,990,633 B2
(45) Date of Patent: Mar. 24, 2015

(54) TRACING SUPPORT FOR INTERCONNECT FABRIC

(75) Inventors: Zheng Xu, Austin, TX (US); Sanjay Deshpande, Austin, TX (US); Michael Snyder, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1612 days.

(21) Appl. No.: 12/427,646

(22) Filed: Apr. 21, 2009

(65) Prior Publication Data

US 2010/0268990 A1    Oct. 21, 2010

(51) Int. Cl.
   *G06F 11/00*   (2006.01)
   *G06F 11/26*   (2006.01)

(52) U.S. Cl.
   CPC ..................................... *G06F 11/26* (2013.01)
   USPC ................. 714/45; 417/25; 417/57

(58) Field of Classification Search
   USPC ....................................... 714/25, 45
   See application file for complete search history.

(56) References Cited

U.S. PATENT DOCUMENTS

| | | | |
|---|---|---|---|
| 6,145,122 A | 11/2000 | Miller et al. | |
| 7,702,964 B2 * | 4/2010 | John | 714/45 |
| 7,870,437 B2 * | 1/2011 | Swaine et al. | 714/45 |
| 8,176,366 B2 * | 5/2012 | Horley et al. | 714/45 |
| 2003/0018929 A1 * | 1/2003 | Bardsley et al. | 714/39 |
| 2005/0234725 A1 * | 10/2005 | Agapi et al. | 704/260 |
| 2006/0174229 A1 * | 8/2006 | Muser | 717/128 |
| 2008/0016408 A1 * | 1/2008 | Abernathy et al. | 714/45 |
| 2009/0063891 A1 * | 3/2009 | Arimilli et al. | 714/2 |
| 2009/0183034 A1 * | 7/2009 | Houlihane et al. | 714/45 |

* cited by examiner

*Primary Examiner* — Sarai Butler
(74) *Attorney, Agent, or Firm* — Haynes and Boone, LLP

(57) ABSTRACT

Complex on-chip interconnect fabrics, particularly those that include point-to-point interconnects and coherent routing networks, can present significant challenges for conventional trace techniques that may be applied in an effort to efficiently provide an external debugger with visibility into on-chip interconnect transactions. Embodiments described herein generate and supply separate in-circuit-trace messages including address messages and data messages, which are sent out (i.e., off-chip) to external debug tools generally without delay and coincident with the distinct, but related, trace events within address and data paths of the interconnect fabric. These separate message instances embed appropriate tag and mark values to allow the message instances to be post-processed and correlated by the external debug tools so as to reconstruct the transaction information for operations performed in the on-chip interconnect.

23 Claims, 4 Drawing Sheets

| FIELD NAME | TCODE | SRC | Mrk | Tag | Type | CDAC | Address | Timestamp |
|---|---|---|---|---|---|---|---|---|
| FIELD LENGTH | 6 | 6 | 1 | 8 | 2 | 4 | VAR | VAR |
| PACKET # | 1 | 1 | 1 | 1 | 1 | 1 | 1/2 | VAR |

FIG. 4

| FIELD NAME | TCODE | SRC | Mrk | Tag | AType | Reserved | AQual | Address | Timestamp |
|---|---|---|---|---|---|---|---|---|---|
| FIELD LENGTH | 6 | 6 | 1 | 8 | 5 | 14 | 6 | VAR | VAR |
| PACKET # | 1 | 1 | 1 | 1 | 1 | 1/2 | 2 | 2/3 | VAR |

FIG. 5

| FIELD NAME | TCODE | SRC | TAG | RW | DSZ | Reserved | DBusData | Timestamp |
|---|---|---|---|---|---|---|---|---|
| FIELD LENGTH | 6 | 6 | 8 | 1 | 4 | 5 | VAR | VAR |
| PACKET # | 1 | 1 | 1 | 1 | 1 | 1 | VAR | VAR |

FIG. 6

TRACING SUPPORT FOR INTERCONNECT FABRIC

BACKGROUND

1. Field

This disclosure relates generally to data processing systems, and more specifically, to in-circuit tracing techniques suitable for on-chip interconnect fabrics.

2. Related Art

Increasingly complex on-chip interconnect micro-architectures have been developed, in part, to achieve higher data transfer bandwidths and/or lower latencies in system on a chip (SoC) designs. Typically, interconnect fabrics in accord with such micro-architectures seek to provide multi-path, point-to-point communications between a large and scalable set of processor cores, memory controllers, caches, direct memory access (DMA) controllers, bridges, etc. In some implementations, coherency management techniques are employed to present a coherent system memory state while allowing multiple in-flight interconnect transactions to proceed concurrently in accordance with some appropriate total ordering of transactions. Basic storage operations such as reading or writing of storage locations, synchronization, etc. may be implemented using multiple transactions between two or more end-point devices.

In these complex interconnect fabrics, particularly those that include point-to-point interconnects and coherent routing networks, it is becoming more and more challenging to efficiently trace and provide an external debugger with visibility into the data flow of the on-chip interconnect transactions. Some of these tracing challenges derive, at least in part, from the confluence of split-transaction techniques and the multiplicity of available interconnect paths and in-flight transactions.

Improved techniques are desired.

BRIEF DESCRIPTION OF THE DRAWINGS

The present invention may be better understood, and its numerous objects, features, and advantages made apparent to those skilled in the art by referencing the accompanying drawings.

FIGS. 4 and 5 illustrate respective terse and verbose debug architecture address message formats in accordance with some embodiments of the present invention.

FIG. 6 illustrates a debug architecture data message format in accordance with some embodiments of the present invention.

The use of the same reference symbols in different drawings indicates similar or identical items. Elements in the drawings are depicted with a goal of simplicity and clarity of illustration and have not necessarily been drawn to scale.

DESCRIPTION OF THE PREFERRED EMBODIMENT(S)

Figure 1:
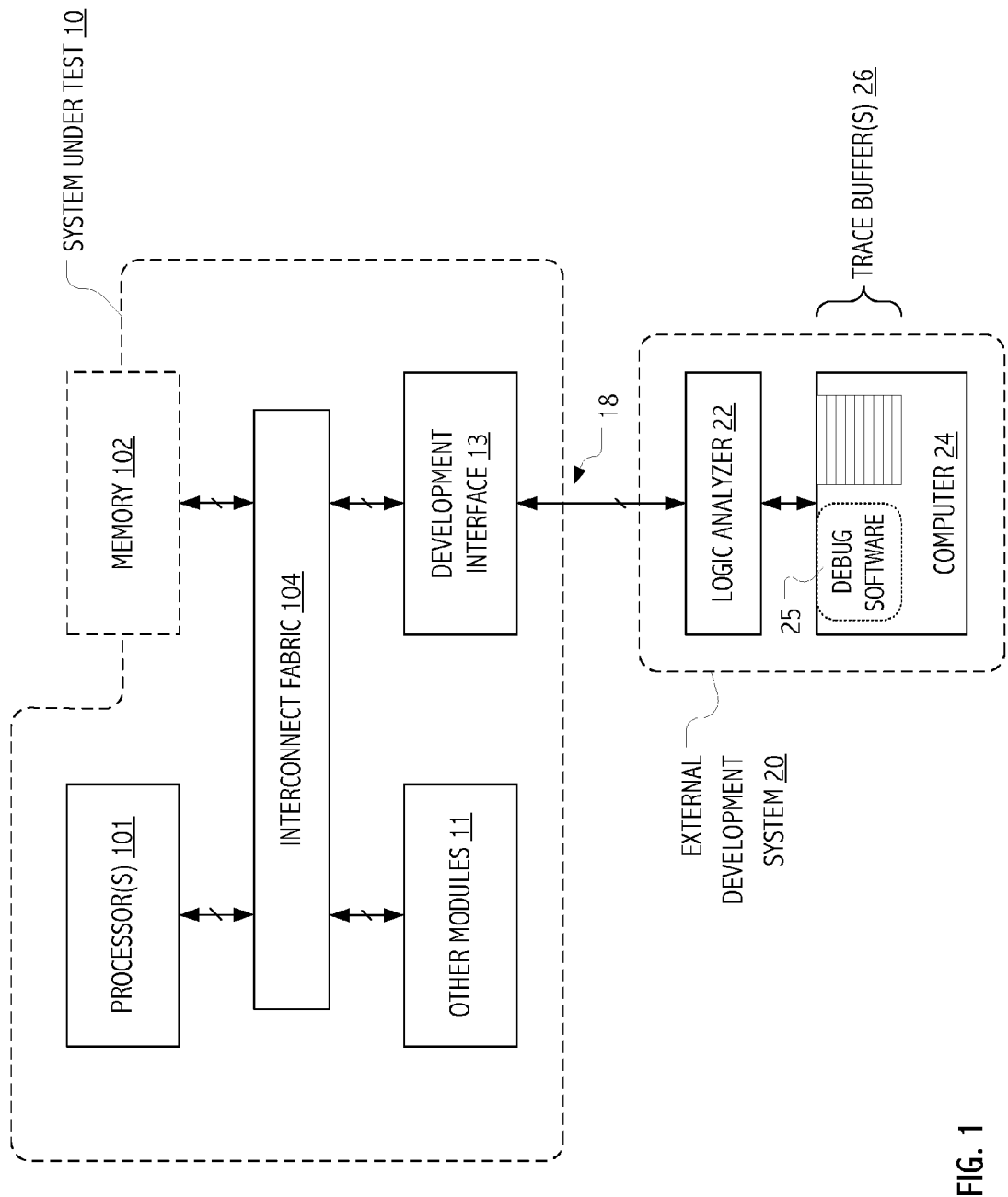
FIGS. 1 and 2 are block diagrams of respective computational systems in which tracing support is provided, in accordance with some embodiments of the present invention, for operations transiting an on-chip interconnect fabric.

Complex on-chip interconnect fabrics, particularly those that include point-to-point interconnects and coherent routing networks, can present significant challenges for conventional trace techniques that may be applied in an effort to efficiently provide an external debugger with visibility into on-chip interconnect transactions. As summarized above, some of these tracing challenges derive from the confluence of split-transaction techniques and the multiplicity of available interconnect paths and in-flight transactions. However, more generally, even interconnect fabrics that employ shared, non-point-to-point physical layer technologies such as an address, response or data bus in a split-transaction manner, may present these or related challenges.

For example, for a read-type operation implemented using an address transaction and a data transaction, conventional bus tracing techniques would, in general, need to maintain a transaction table where addresses (from the address transaction) and tags are stored until corresponding data information is available (in connection with the data transaction) to generate the trace message. Unfortunately, such a transaction table, in general, needs to scale with the number of outstanding transactions allowed by the on-chip coherent interconnects. Given typical constraints on debug storage space, such a transaction table might be limited to storing only the addresses of the transactions without more detailed information about attributes of the transactions. Given storage space constraints, timestamping may necessarily be limited to a timestamps at data availability, i.e., when a trace message is generated based on transit of the corresponding data transaction. Finally, for on-chip interconnect fabric with point-to-point connections, tracing at each port in a fashion that may be desirable for certain debug tasks may be storage cost prohibitive.

Developed techniques are illustrated and will be understood in the context of a concrete implementation of a particular scalable on-chip coherent network architecture for interconnecting multiple processing cores with caches, memory controllers, DMA controllers, bridges etc. referred to as the CoreNet™ architecture. CoreNet is a trademark of Freescale Semiconductor, Inc. Of course, embodiments of the present invention are not limited to any particular on-chip interconnect. However, based on the description herein and the concrete illustrative context provided by CoreNet architecture, implementations and nomenclature, persons of ordinary skill in the art will appreciate a wide range of implementations and adaptations of the described techniques, including implementations and adaptations of other on-chip interconnect architectures. In view of the above, and without limitation, we now describe an illustrative embodiment consistent with CoreNet architecture and nomenclature.

Some embodiments in accordance with the present invention generate and supply separate in-circuit trace messages including CoreNet Address Messages (CAMs), CoreNet address Response Messages (CRMs) and CoreNet Data Messages (CDMs), which are sent out (i.e., off-chip) to external debug tools generally without delay and coincident with the distinct, but related, trace events within address, address response and data paths of the interconnect fabric. For purposes of illustration, the description herein focuses on examples in which information embedded in CAM and CDM instances facilitates off-chip correlation of one or more message instances with another. Nonetheless, based on the description herein, persons of ordinary skill in the art will appreciate that the described techniques may be applied to correlation of other types of trace messages including off-chip correlation of address trace-type message instances and address response-type message instances and off-chip correlation of trace message, such as CAM, CRM and CDM instances, that trace flows at or over bus- or link-type paths, and messages that may be generated using in-circuit emulation techniques. In view of the above, and without limitation, the description that follows focuses on CAMs and CDMs as representative instances of first and second transaction phase trace messages.

Separate, but correlatable, CAM and CDM instances embed appropriate tag and mark values to allow the CAMs and CDMs to be post-processed and correlated by the external debug tools so as to reconstruct the transaction information for operations performed in the on-chip interconnect. Methods have been developed to selectively trace and correlate request (address) and data phases of an operation using Transaction Address/Attribute Compare (TAC) debug conditions and Transaction Data Compare (TDC) debug conditions.

In some embodiments, the developed structures, techniques and methods facilitate implementations and operations without on-chip buffering of the addresses and data for integration into a unified trace message. Rather, CAMs and CDMs are separately generated and sent to the external debug tools whenever they are available. In part due to the reduced pressure on on-chip storage, CAMs can be configured in verbose as well as terse modes so that different levels of transaction (address and/or attribute) information can be provided to the external debugger for better visibility and bandwidth utilization.

Address compare debug conditions are generated in the address path of the interconnect fabric at a global ordering point (GOP) and are passed to the data path along with the transaction. Data value compare debug conditions can be generated in the data path for the transaction of interest. Timestamps can be added to either or both of CAMs and CDMs. As a result, an external debugger can gain insight into the latency and lifetime of each operation and its constituent transactions and correlate them with the core processor instruction or data trace. In some embodiments, CAMs are generated for a GOP in accord with the imposed ordering while CDM are generated off sublinks only for the target devices. In some embodiments, this approach can reduce the amount of resources required for implementation of the trace micro-architecture for a point-to-point crossbar routing network.

From an on-chip perspective, some embodiments in accordance with the present invention include a method of testing an integrated circuit chip wherein, based on operations in an on-chip interconnect fabric, at least two separate streams of trace messages are received off-chip. The first stream includes trace messages corresponding to a first transaction phase of respective ones of the operations and the second stream includes trace messages corresponding to a second transaction phase of respective ones of the operations. The method includes correlating off-chip individual ones of the first phase trace messages with individual ones of the second phase trace messages. In some embodiments, the integrated circuit chip from which the trace messages are received includes (i) multiple processor cores, (ii) ports corresponding to addressable resources and (iii) an interconnect fabric coupled therebetween. First and second phase trace messages correspond to transit of respective transactions through respective address path and data path portions of the interconnect fabric.

In some embodiments, the method further includes performing the off-chip correlating based on information that is embedded in the separate streams in association with corresponding ones of the trace messages. The information embedded in association with a particular trace message may include either or both of a tag and a debug condition. For a particular operation, first transaction phase may be a request transaction, while the second transaction phase may be a corresponding data transaction. In some cases, a request transaction may be an address transaction. In some cases, a request transaction may specify synchronization or a barrier.

Each of the first phase trace messages supplied off-chip is supplied without on-chip buffering for correlation with a separately generated but corresponding second phase trace message. For at least some of the transactions, a first phase trace message is received off-chip before a corresponding, second phase trace message is generated on-chip. In some embodiments, the flux of trace messages supplied off-chip is limited by selectively generating or filtering at least some of the first and second phase trace messages based on correspondence of respective transactions with respective, user specified-debug criteria. For example, debug criteria may be selective for transactions with a specified set or range of address targets, and/or for transactions with a specified requester id, and/or for transactions of a specified operation type (e.g., read, write, sync etc.). Either or both of the first and second phase trace messages received off-chip may correspond to a subset of transactions and, in such case, the subset may be selected on-chip based on either or both of debug criteria-based predicates on trace message generation and debug criteria-based selections of generated trace messages.

From an off-chip perspective, some embodiments in accordance with the present invention include a method of testing an integrated circuit chip that includes, responsive to transactions on-chip, generating at least two uncorrelated streams of trace messages for supply off-chip. The first stream includes trace messages corresponding to a request transaction phase of respective operations and the second stream includes trace messages corresponding to a data transactions phase of respective operations. The method further includes embedding information in the separate streams in association with corresponding ones of the request and data phase trace messages and supplying the separate streams off-chip for off-chip correlation of respective request and data phase trace messages thereof based on the embedded information.

In some embodiments, the request phase trace messages are generated relative to propagation of corresponding transactions via an address path of an interconnect fabric of the integrated circuit chip and in accord with a global ordering of the transactions. In some embodiments, the data phase trace messages are generated relative to propagation of corresponding transactions via a data path of the interconnect fabric of the integrated circuit chip. In some embodiments, the method further includes, based on correspondence of transactions with user specified-debug criteria, marking respective transactions propagated via the address path with respective condition codes and passing from the address path to the data path the respective condition codes along with the respective transactions.

System and Integrated Circuit Realizations, Generally

FIG. 1 illustrates a computational system under test 10 in which tracing support is provided for operations transiting an on-chip interconnect fabric 104. Processors 101, memory 102 and other modules 11 are of any conventional or otherwise suitable design. In the illustrated configuration, at least processors(s) 101, interconnect fabric 104 and some cache storage corresponding to memory 102 reside on-chip. Typically, a level of cache memory and memory control circuits reside on-chip while banks of random access memory may be provided off-chip. Other modules 11 typically include at least the on-chip portions of an input/output (I/O) subsystem including, where appropriate, I/O bridges, direct memory access (DMA) controllers and/or I/O devices themselves.

Development interface 13 couples between the on-chip interconnect fabric 104 and ordinarily presents pins or some other suitable terminal interface(s) 18 in accord with an agreed interface standard such as IEEE-ISTO 5001™ (Nexus) and/or IEEE 1149.1 joint test action group (JTAG). In general, any of a variety of implementations of development interface 13 is acceptable and persons of ordinary skill in the art will appreciate numerous suitable implementations, that provide the auxiliary pin functions, transfer protocols, and development features specified for such an agreed standard. While a proprietary interface could also be acceptable, a standardized test interface is generally preferred. IEEE-ISTO 5001 is a trademark of the IEEE Industry Standards and Technology Organization.

Whatever the configuration and selection of development interface 13 (and terminal interface(s) 18 thereto), support is provided for at least a subset of the ordinary debugger-, logic analyzer-, data acquisition-, prototyping- and/or run-time parameter tuning-related data transfers and functional triggering capabilities of modern test environments, including those related to program, data, and bus tracing, read and write access to internal resources, etc. That said, for purposes of this description of embodiments of the present invention, other than conventional support for bus tracing-type message transfers, additional capabilities (while useful) are largely irrelevant.

In one embodiment, external development system 20 includes a logic analyzer 22 with trace probes coupled to a computer 24. The computer 24 hosts debug software 25 and includes storage usable as trace buffers 26. Although computer 24 and debug software 25 may provide design and test engineers with any of a variety of features and capabilities, for purposes of this description of embodiments of the present invention, the salient point is that computer 24 hosts debug software 25 and includes storage usable as trace buffers 26 into which separately generated trace messages (e.g., the separate CAM and CDM instances described elsewhere herein) may be received. As described herein, those separately generated trace messages received into storage, such as that provided by trace buffers 26, embed appropriate tag values to allow the CAMs and CDMs to be post-processed and correlated by the external debug tools (e.g., debug software 25) so as to reconstruct the transaction information for operations performed in the on-chip interconnect. Based on the description herein, persons of ordinary skill in the art will appreciate any of a variety of data compare and match techniques that may be employed in debug software 25 so as to identify corresponding tag values in respective CAM and CDM instances. Debug software 25 is of any suitable and/or commercially reasonable design.

Figure 2:
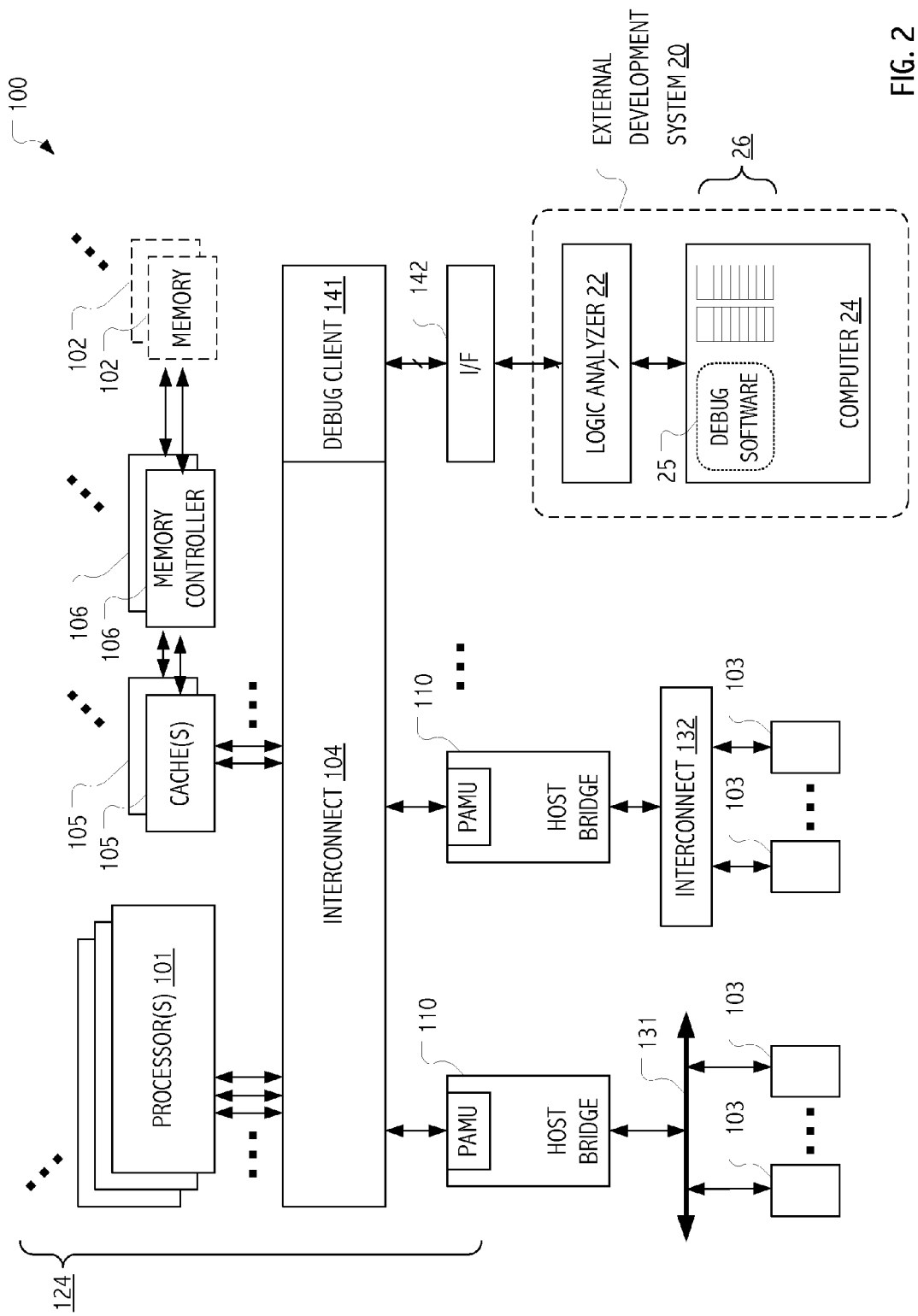

FIG. 2 illustrates a somewhat more complex computational system 100 in which processors 101, memory 102 and I/O devices 103 are coupled by an interconnect 104. Although any of a variety of memory hierarchies may be employed, FIG. 2 illustrates a configuration in which at least some level of cache 105 is interposed between interconnect 104 and memory 102 (and associated memory controllers 106). In some embodiments, caches 105 are configured as L3 cache and represent state that spans the data and instruction spaces of processors 101, while additional levels of L1 and L2 cache (not separately shown) are collocated with individual processors or processor cores.

In the illustrated configuration, interconnect 104 includes a scalable on-chip network that is suitable for interconnecting multiple processor cores with memory and I/O subsystems. Processors 101 are linked to each other, to memory 102 and to host bridges 110 via the interconnect 104 and, in some embodiments, interconnect 104 implements a modern front-side multi-path interconnect fabric that supports concurrent non-conflicting transactions and high data rates. Any of a variety of interconnect topologies and physical-layer, data-link and transaction layer protocols may be implemented; however, in general, interconnect 104 presents each of the system components coupled at ports thereof with a coherent view of memory state and provides coherency related semantics for split address and data transactions consistent with a coherence model that specifies interactions with devices, states maintained, state transitions and actions necessary to achieve coherent behavior.

Coherency domain 124 spans the collection of memory subsystems including memory 102 and caches (e.g., the illustrated L2/L3 caches 105 and any other caches or lookaside stores), processors 101, interconnect 104, and I/O host bridges 110 that cooperate through relevant protocols to meet memory coherence, consistency, ordering, and caching rules specific to a platform architecture. For example, in some embodiments, coherency domain 124 conforms to coherence, consistency and caching rules specified by Power Architecture™ technology standards as well as transaction ordering rules and access protocols employed in a CoreNet™ interconnect fabric. Power Architecture is a trademark of Power-.org and refers generally to technologies related to an instruction set architecture originated by IBM, Motorola (now Freescale Semiconductor) and Apple Computer. CoreNet is a trademark of Freescale Semiconductor, Inc.

In the illustrated configuration, interconnect 104 includes separate address path and data path portions. For a given read-operation in the coherence domain, separate address phase and data phase transactions transit the respective address path and data path portions. Trace support 141 provides condition check logic suitable for identifying selected transactions (e.g., based on address value, data value or other criteria) and generating trace messages in connection with transit of the respective address phase and data phase transactions through interconnect 104. As is typical of debug architectures, trace support 141 also allows for event condition triggers and actions (e.g., halt, trace enable/disable) as debug and/or watchpoint events.

In the illustrated configuration, I/O devices 103 do not connect directly to primary processor busses, but rather via respective host bridges 110. In general, any given I/O device 103 attaches to an I/O interconnect, such as PCI Express, AXI or other interconnect technology, and has a set of resources appropriate to its function. For generality, bus-type interconnects 131, multiplexed interconnects 132 and mixed-type interconnect configurations 133 are all illustrated. Operations that involve an I/O device 103 may include storage operations initiated from within coherency domain 124 which cross the coherency domain boundary, storage operations initiated from outside coherency domain 124 that target storage (e.g., memory 102) within the coherency domain, and storage operations initiated outside coherency domain 124 that target storage that is also outside the coherency domain. As a result, although much of the discussion herein tends to focus on access operations, constituent address- and data-phase transactions in interconnect 104 and corresponding trace messages that are frequently associated with interactions between processors 101 and memory 102, applications of the invented techniques are not limited thereto.

For purposes of illustration, and without limitations as to operation types and variants supported, I/O device 103 is representative of a collection of devices that initiate read/write-type operations and that are themselves targets of read/write-type operations initiated by processors (e.g., processors 101) and/or other I/O devices. In some cases, read- and/or write-type operations supported by I/O devices include implementation- or device-specific variants that contemplate synchronization, coherence or other enhancements to basic read/write operation semantics. Likewise, sources and targets of operations in a coherency domain tend to support read/write-type operations with reasonably complex semantic variations. For example, in configurations such as illustrated in FIG. 2, the set of operation types supported by processors 101, memories 102 and other sources and targets of operations in coherency domain 124 will tend to include semantic variations consistent with coherence, ordering, synchronization and other protocols enforced within the domain.

In some embodiments, a substantial portion of a computational system such as illustrated in FIG. 2 is implemented as a system on a chip (SoC) and embodied as a single integrated circuit chip. In such configurations, memory and/or a subset of I/O devices or interfaces may be implemented on- or off-chip, while the substantial entirety of illustrated blocks are packaged as an SoC. However, in other embodiments and more generally, portions of computational system 100 may be implemented in or as separate integrated circuits in accord with design, packaging or other requirements.

Interface 142 couples trace support of an on-chip debug client 141 out to an external development system that receives the trace messages (including the separate CAM and CDM instances described elsewhere herein) and, as before, presents pins or some other suitable terminal interface(s) in accord with an agreed interface standard such as IEEE-ISTO 5001 (Nexus) or IEEE 1149.1 joint test action group (JTAG).

As before, external development system 20 includes a logic analyzer 22 coupled to a computer 24 that hosts debug software 25 and includes storage usable as trace buffers 26 into which separately generated trace messages (e.g., the separate CAM and CDM instances described elsewhere herein) may be received. As described herein, separately generated trace messages received into storage, such as that provided by trace buffers 26, embed appropriate tag values to allow the CAMs and CDMs to be post-processed and correlated by the external debug tools (e.g., debug software 25) so as to reconstruct the transaction information for operations performed in the on-chip interconnect. Debug software 25 is of any suitable and/or commercially reasonable design and includes any of a variety of data compare and match techniques to identify corresponding tag values in respective CAM and CDM instances.

Debug Architecture

Figure 3:
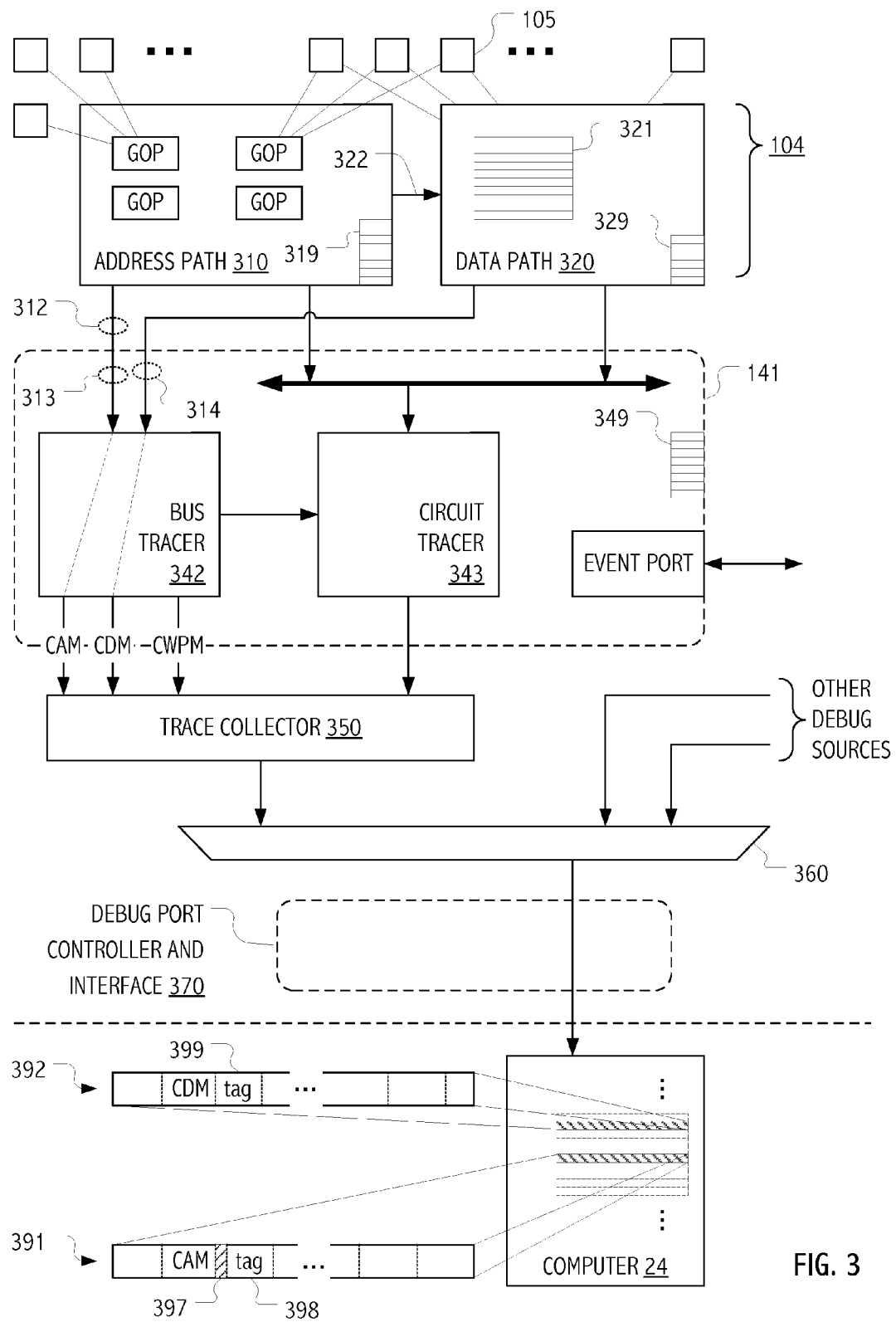
FIG. 3 is a functional block diagram illustrating contributions to separate flows of debug architecture address messages and data messages in accordance with some embodiments of the present invention for off-chip correlation.

FIG. 3 is a functional block diagram of debug block for an on-chip interconnect fabric such as described above illustrated with off-chip trace buffer storage. On-chip debug logic is distributed amongst three major blocks: an address path 310, a data path 320 and debug client 141. Address path 310 and data path 320 blocks couple to (and between) processor, memories and other sources and targets of read- and write-type operations in a coherency domain. Many interconnect fabric operations, including read- and write-type storage operations mediated thereby, are implemented as pairs of address and data phase transactions. For example, to implement a typical read-type storage operation, an address transaction is initiated at a port of the on-chip interconnect fabric (e.g., that associated with a processor 101 seeking to performing a read-type access) and transits address path 310 and is supplied at another port (e.g., that associated with a cache 105 to which the read-type access resolves). After corresponding data is retrieved from cache 105 (or from other storage in a storage hierarchy), it is supplied in a data phase transaction via data path 320 (queued in data buffer 321 in cases of competing traffic) and eventually provided to processor 101 in satisfaction of the read-type access performed thereby. It is these and other similar types of address and data phase (or path) transactions that embodiments in accordance with the present invention seek to trace.

To facilitate tracing and other debug functionality, address path 310 includes a series of debug registers 319. Amongst these are a multiplicity x of data address compare (CDACx) and transaction attribute compare (CTACx) registers whereby match criteria for transactions of interest may be set. For a given transaction of interest, address path 310 sends the transaction request information 312 (e.g., address, tag ATag, type Atype, address qualifiers Aqual, etc.) along with debug conditions 313 (e.g., the match criteria CDACx) to bus tracer 342 of debug client 141. Address path 310 includes comparators in each global order point GOP to perform data address- and/or transaction-attribute compare functions and generate the CDACx debug conditions. The CDACx debug conditions, if enabled, can trigger a debug halted state. The address path 310 block can also send information via debug bus to a circuit tracer block 342. In some embodiments, the debug block includes aggregated "snoop" response data as part of the circuit tracing information.

Data path 320 also includes a series of debug control registers 329. Amongst these are a multiplicity x of data value compare (CDVCX) and registers whereby match criteria for transactions of interest may be set. For a given transaction of interest, data path 320 sends the transaction data information 314 to bus tracer 342 of debug client 141. Data path 320 includes comparators at the read ports of data buffer 321 to perform data value compare functions and generate the CDVCx debug conditions. CDACx debug conditions are sent (322) from address path 310 to data path 320 as well as to debug client 141. The data path 320 block can also send information via a debug bus to circuit tracer block 342.

In some embodiments, debug client 141 implements Nexus trace functionality with using a bus tracer 342 and a circuit tracer 343. Bus tracer 342 tracks the address and data of the transactions of interest (e.g., information and conditions 312, 313, 314) and generates/formats corresponding CoreNet address messages (CAM), CoreNet data messages (CDM) and CoreNet watchpoint messages (CWPM). Individual CAM instances are generated based on the request information from each global ordering point GOP. Individual CDM instances are generated based on the data input information for the selected system logic ports of the interest.

CoreNet Address Messages

Terse and verbose forms of CAM instances are supported in some embodiments. FIG. 4 illustrates an exemplary terse message encoding, while FIG. 5 illustrates an exemplary verbose message encoding. Both encodings include a transaction code field in accord with IEEE-ISTO 5001 and a source ID field (SRC) that uniquely identifies the source module. In some embodiments, lower order bits of the SRC field are used to distinguish various message types (including CAM and CDM message types). A mark Mrk field indicates to a downstream recipient of CAM instance that a corresponding CDM instance is expected based on debug conditions during handling of the address phase transaction. Both the CAM instance and the corresponding CDM instance have matching Tag field values. In the illustrated embodiment, a selected portion (ATagIn[6:13] of an address tag applied at address path 310 and propagated through the interconnect fabric to a corresponding data tag in data path 320) is used. The stream of CAMs serves as the reference for other trace streams including the stream of CDMs.

Other fields include a transaction type field, an encoding of at least a portion of the target address and an optional timestamp. In a terse message encoding, an abbreviated coding of transaction types is provided and data address compare debug conditions CDAC are supplied, whereas in a verbose message encoding, a more expansive set of transaction type encodings is available, together with field codings for additional information and address qualifiers AQual. In some embodiments, a verbose message encoding may also provide greater coding width for target address information.

In general, a CAM terse message is used to provide a lesser amount of information about the globally ordered transaction for software debugging. CAM terse messages may require the user to track the corresponding filtering configuration in order to provide more precise information about the address phase of the transaction. In some embodiments and with some address widths, a CAM terse message is coded within two Nexus packets without timestamp and three Nexus packets with timestamp. In contrast, a CAM verbose message is used to provide more detailed or precise information about the globally ordered transactions for software performance tuning and silicon debugging. In some embodiments and with some address widths, a CAM verbose message is coded within three Nexus packets without timestamp and four Nexus packets with timestamp.

CoreNet Data Messages

FIG. 6 illustrates an exemplary CDM encoding. As before, the encoding includes a transaction code field in accord with IEEE-ISTO 5001 and a source ID field (SRC) that uniquely identifies the source module. A CDM message is generated at the data-in (Din) stage of the CoreNet data path transaction. A particular CDM instance can be correlated with a corresponding CAM instance based on the correspondence of Tag fields encoded therein. In the illustrated embodiment, a selected portion (DTagIn[6:13] of a data tag that results from a propagation of the corresponding address tag applied at address path 310 to data path 320) is used. In this way, correspondence of Tag fields applied to correlatable CAM and CDM instances is assured. Additional CDM fields include a read or write RW indication, a data size DSZ coding, a data DBus-Data encoding and an optional Timestamp.

As with the CAM, a CDM instance is used to provide data information for transactions of interest. It can be used for software debugging as well as silicon debugging. CDM instance tracks data input at a corresponding bus-interface or link with a data destination matching the specification. In each cycle, a CDM instance can be generated for the selected link data matching each CDVCx debug condition. The CDM message is formatted and sent to the Nexus trace collector 350 immediately when the data is received off the interconnect sublink. In some embodiments and with some address widths, a CDM instance can be coded within six Nexus packets without timestamp and seven Nexus packets with timestamp.

Off-Chip Correlation

CAM and CDM instances are generated and separately sent out to external debug tools (e.g., trace buffers 26) and correlated off-chip based on matching Tag information embedded in corresponding messages. Notably, information for trace messages need not be queued on-chip, but rather, in each case (CAM and CDM), may be immediately supplied to trace buffers 26. In the illustrated configuration additional trace message traffic is collected at trace collector 350 and further debug sources are multiplexed (360) for communication via debug port and controller interface 370.

Trace messages that result from CDACx/CDVCx debug conditions generated in address path 310 and data path 320, tag values suitable to support off-chip correlation can be introduced within the interconnect fabric itself. CDACx debug conditions for a transaction live through the lifetime of the transaction and are passed from address path 310 and data path 320 along with other transaction request information. CDACx debug conditions are used in data path 320 for CDVC debug conditions evaluation. For an address phase transaction, a CAM message (e.g., CAM instance 391) is generated and sent out to the external debug tool with transaction tag 398 that depends on the debug conditions. During a corresponding data phase transaction, a CDM message (e.g., CDM instance 392) is generated and sent out to the external debug tool with transaction tag 399 that likewise depends on the debug conditions.

Accordingly, CAM instance 391 and corresponding CDM instance 392 may be correlated off-chip. In the illustrated configuration, mark Mrk indication 397 of CAM instance 391 indicates that a corresponding CDM instance is expected. Accordingly, to perform the off-chip correlation, debug software running on computer 24 (or some other suitable comparison logic) may simply check later arriving trace messages for tag field correspondence with the value encoded in tag 398 of CAM instance 391.

Other Embodiments

Although the invention is described herein with reference to specific embodiments, various modifications and changes can be made without departing from the scope of the present invention as set forth in the claims below. For example, while techniques have been described in the context of particular interconnect and system configurations, the described techniques have broad applicability to designs in which separate trace messages are generated at separate phases of an operation or transaction.

Embodiments of the present invention may be implemented using any of a variety of different information processing systems. Of course, architectural descriptions herein have been simplified for purposes of discussion and those skilled in the art will recognize that illustrated boundaries between logic blocks or components are merely illustrative and that alternative embodiments may merge logic blocks or circuit elements and/or impose an alternate decomposition of functionality upon various logic blocks or circuit elements.

Articles, systems and apparati that implement the present invention are, for the most part, composed of electronic components, circuits and/or code (e.g., software, firmware and/or microcode) known to those skilled in the art and functionally described herein. Accordingly, component, circuit and code details are explained at a level of detail necessary for clarity, for concreteness and to facilitate an understanding and appreciation of the underlying concepts of the present invention. In some cases, a generalized description of features, structures, components or implementation techniques known in the art is used so as to avoid obfuscation or distraction from the teachings of the present invention.

Finally, the specification and figures are to be regarded in an illustrative rather than a restrictive sense, and consistent with the description herein, a broad range of variations, modifications and extensions are envisioned. Any benefits, advantages, or solutions to problems that are described herein with regard to specific embodiments are not intended to be construed as a critical, required, or essential feature or element of any or all the claims.

What is claimed is:

1. A method of testing an integrated circuit chip, the method comprising:
based on operations performed within an interconnect fabric located on-chip, receiving off-chip at least two separate streams of trace messages, the first stream including trace messages corresponding to a first transaction phase of respective ones of the operations and the second stream including trace messages corresponding to a second transaction phase of the respective operations; and correlating off-chip individual ones of the first phase trace messages with one or more of the second phase trace messages.

2. The method of claim 1, further comprising:

wherein the integrated circuit chip from which the trace messages are received includes multiple processor cores, ports corresponding to addressable resources and the on-chip interconnect fabric coupled therebetween, and wherein first and second phase trace messages correspond to transit of respective transactions through respective address path and data portions of the on-chip interconnect fabric.

3. The method of claim 1, further comprising:

wherein the first phase trace messages correspond to transit of respective address request-phase transactions; and wherein the second phase trace messages correspond to one or more of:

transit of respective data transactions;

transit of respective address response transactions; and snoop response information.

4. The method of claim 1, further comprising:

performing the off-chip correlating based on information that is embedded in the separate streams in association with corresponding ones of the trace messages.

5. The method of claim 4, wherein the information embedded in association with a particular trace message includes either or both of:

a tag; and a debug condition.

6. The method of claim 1, wherein the first transaction phase of a particular respective operation includes an address request transaction; and wherein the second transaction phase of the particular respective operation includes a data transaction.

7. The method of claim 1, wherein the first transaction phase of a particular respective operation includes a synchronization or barrier transaction.

8. The method of claim 1, wherein each of the first phase trace messages supplied off-chip is supplied without on-chip buffering for correlation with a separately generated but corresponding second phase trace message.

9. The method of claim 1, wherein, for at least some of the operations, a first phase trace message is received off-chip before a corresponding, second phase trace message is generated on-chip.

10. The method of claim 1, further comprising:

limiting flux of trace messages supplied off-chip by selectively generating or filtering at least some of the first and second phase trace messages based on correspondence of respective transactions with respective, user specified-debug criteria.

11. The method of claim 1, wherein either or both of the first and second phase trace messages received off-chip correspond to a subset of transactions; and wherein the subset is selected on-chip based on either or both of:

one or more debug criteria-based predicates on trace message generation; and one or more debug criteria-based selections of generated trace messages.

12. A method of testing an integrated circuit chip, the method comprising:

responsive to operations performed within an interconnect fabric located on-chip, generating at least two separate streams of trace messages for supply off-chip, the first stream including trace messages corresponding to a request phase of respective ones of the operations and the second stream including trace messages corresponding to a data phase of the respective operations;

embedding information in the separate streams in association with corresponding ones of the request and data phase trace messages; and supplying the separate streams off-chip for off-chip correlation of respective request and data phase trace messages thereof based on the embedded information.

13. The method of claim 12, wherein the request phase trace messages are generated relative to propagation of corresponding transactions via an address path of the on-chip interconnect fabric of the integrated circuit chip and in accord with a global ordering of the transactions.

14. The method of claim 13, wherein the data phase trace messages are generated relative to propagation of corresponding transactions via a data path of the on-chip interconnect fabric of the integrated circuit chip.

15. The method of claim 14, further comprising:

based on correspondence of transactions with user specified-debug criteria, marking respective transactions propagated via the address path with respective condition codes; and passing from the address path to the data path the respective condition codes along with the respective transactions.

16. The method of claim 12, wherein the information embedded in association with a particular trace message includes either or both of:

a tag; and a debug condition.

17. The method of claim 12, wherein at least some of the request phase trace messages are supplied using a terse coding format; and wherein at least some others of the request phase trace messages are supplied using a verbose coding format.

18. The method of claim 12, wherein the off-chip supply of separate streams is via a trace buffer.

19. An apparatus comprising:

an integrated circuit chip that includes a multi-path interconnect fabric located on-chip, wherein request and data phase transactions of a particular operation traverse at least partially distinct portions of the multi-path interconnect fabric and are separated in time;

one or more global ordering points of the multi-path interconnect fabric from which request phase trace messages are generated based on operations performed within the multi-path interconnect fabric for supply off-chip;

one or more transaction destinations for which data phase trace messages are generated separately from the request phase trace messages based on operations performed within the multi-path interconnect fabric for supply off-chip; and an interface for supplying separate streams of the request phase and data phase trace messages off-chip, wherein the separate streams include with the generated request phase and data phase trace messages embedded information suitable for use off-chip to correlate respective ones of the request phase and data phase trace messages with each other.

20. The apparatus of claim 19, further comprising:
an off-chip test system configured to correlate respective ones of the request phase and data phase trace messages with each other based on the embedded information.

21. The method of claim 1, wherein the first and second streams are generated by an on-chip debug client directly coupled to or integrated with the on-chip interconnect fabric.

22. The method of claim 12, wherein the at least two separate streams are generated by an on-chip debug client directly coupled to or integrated with the on-chip interconnect fabric.

23. The method of claim 1, wherein some of the operations in the on-chip interconnect fabric are initiated in response to a processor operation, and wherein some of the operations in the on-chip interconnect fabric are initiated in response to an I/O device operation.

* * * * *